May 1, 1928.  
W. G. PETERS  
1,667,868  
CABINET WRINGER  
Filed April 16, 1920 2 Sheets-Sheet 1
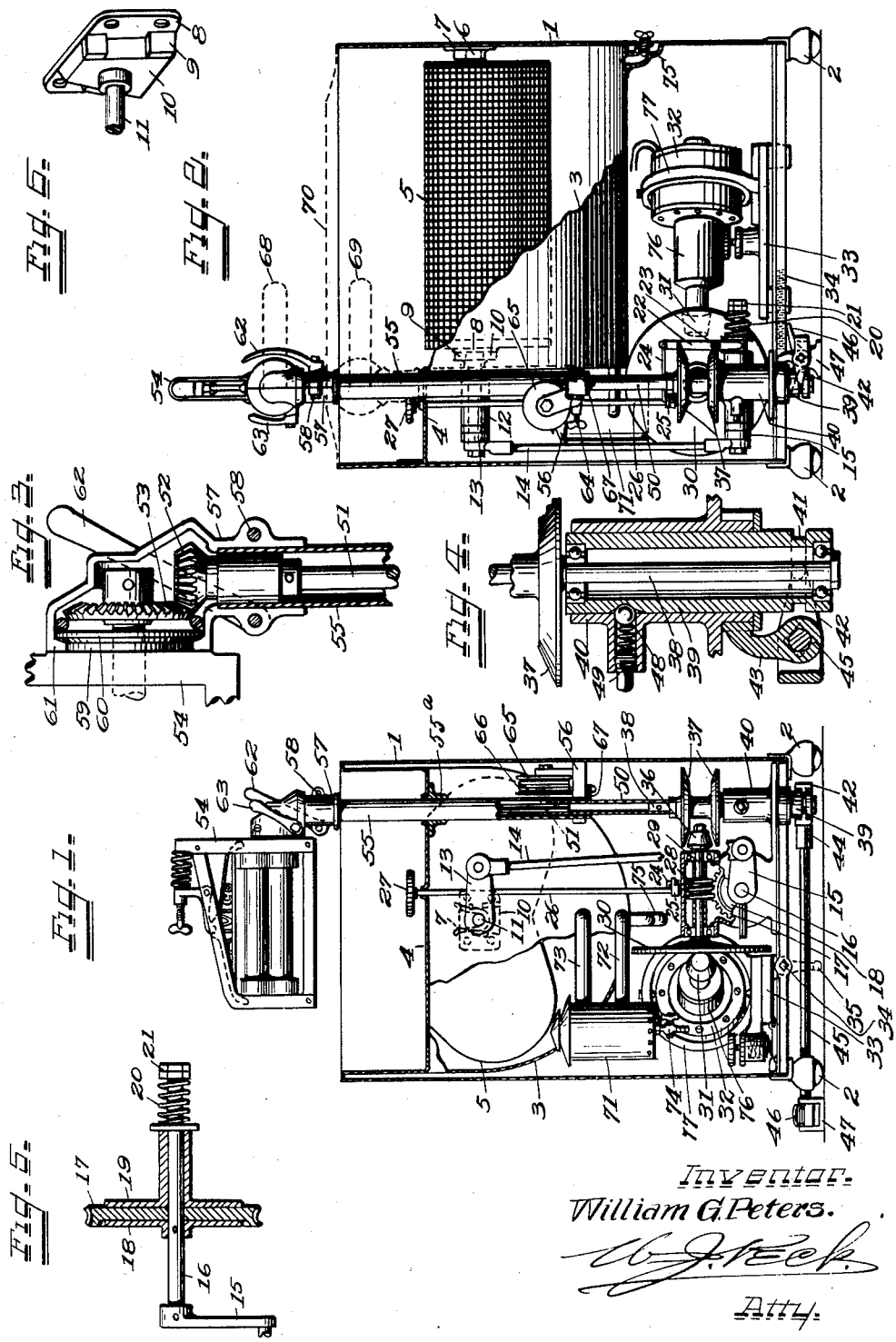
Inventor.  
William G. Peters.  
Atty.

May 1, 1928. 1,667,868
W. G. PETERS
CABINET WRINGER
Filed April 16, 1920 2 Sheets-Sheet 2
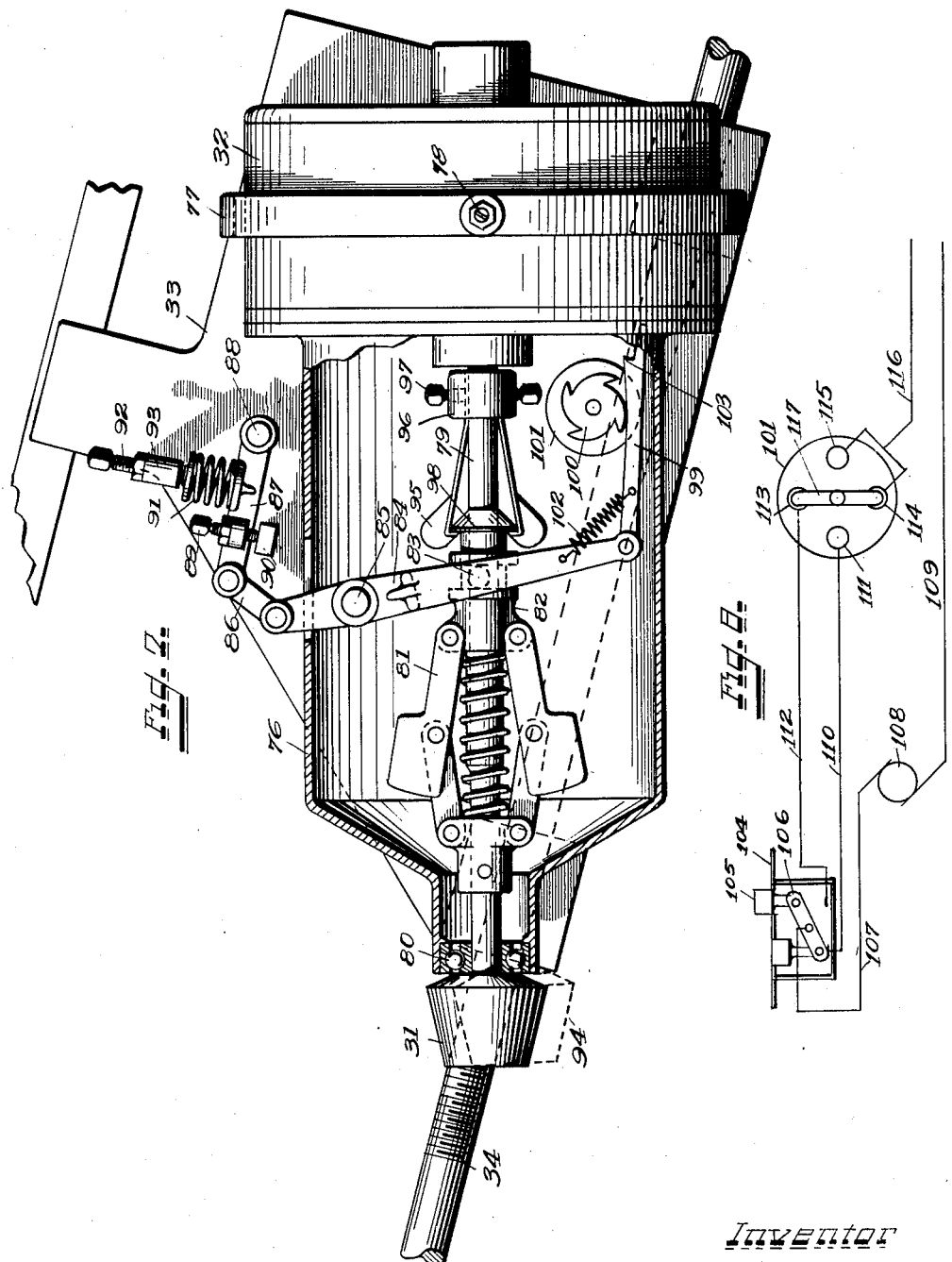
Inventor
William G. Peters.
Atty.

Patented May 1, 1928.

1,667,863

UNITED STATES PATENT OFFICE.

WILLIAM G. PETERS, OF PEORIA, ILLINOIS, ASSIGNOR TO WESTINGHOUSE ELECTRIC & MANUFACTURING COMPANY, A CORPORATION OF PENNSYLVANIA.

CABINET WRINGER.

Application filed April 16, 1920. Serial No. 374,378.

My invention relates to washing machines primarily intended for family use, my invention being particularly adaptable to that class of such machines known as cabinet machines, though the principles of construction and method of operation may be advantageously used for other purposes.

One object of my invention is to provide the machine with a variable speed, whereby its functions may be performed to the best advantage upon various classes of work.

Another object of my invention is to provide and so arrange the driving mechanism of a wringer, that the wringer may be operated in either direction, from practically any point around the machine, and to so arrange the mounting of the wringer that when the cover of the machine is in place, the wringer may be folded so as to come within the area of the housing of the machine, to the end that it will not be necessary to disconnect and remove the wringer from the machine in order to place the cover on the machine.

Another object of my invention is the provision of an overload driving mechanism for the driving element to prevent injury to the driving connections when the washing element is overloaded or when the proper functions of this part of the machine are interfered with from any other cause.

Another object of my invention is the provision of means whereby when the machine is operated by the usual type of electric motor an automatic mechanism is incorporated in the machine to disconnect the current from the motor when the latter is overloaded, thereby preventing burning out or other injury to the motor.

Another object of my invention is the provision of means whereby when the machine is operated with a friction drive as illustrated, and when the motor is at rest, the friction driving elements will be disengaged to the end that no flat spots will be produced upon the surface of the driving elements due to these parts remaining in contact under pressure for comparatively long periods of time when the machine is not in service.

Another object of my invention is the provision of means whereby the temperature of the washing bath may be maintained during the washing operation or the bath may be introduced into the machine and heated therein.

Other objects of my invention will appear and be described in the specification.

The novelty of my invention will be hereinafter more fully set forth and specifically pointed out in the claims.

In the accompanying drawing Fig. 1, Sheet 1, is an end view of a machine embodying my invention, the housing thereof being shown partly in section, and some of the interior parts being partly broken away.

Fig. 2, Sheet 1, is a side elevation of the machine shown in Fig. 1, some of the parts being broken away.

Fig. 3, Sheet 1, is an enlarged view of the wringer supporting and driving connections, partly in section and showing a part of the supporting and housing members removed.

Fig. 4, Sheet 1, is a sectional view of the means for operating the wringer in either direction.

Fig. 5, Sheet 1, is a sectional view of the overload clutch used in connection with the driving of the clothes container.

Fig. 6, Sheet 1, is a perspective detail view of the disengageable driving connection between the clothes container and its operating shaft.

Fig. 7, Sheet 2, is a plan view partly in section of the automatic mechanism for the switch, and for engaging or disengaging the driving mechanism.

Fig. 8, Sheet 2, is a wiring diagram showing the wiring of the automatic switch, the hand operated switch and the motor circuit.

The same characters of reference are used to indicate identical parts in all the figures.

As shown in Figs. 1 and 2 the machine comprises a housing or cabinet 1 mounted upon casters 2 and containing a washing bath receptacle 3 which is preferably semicylindrical as shown in Fig. 1 and extends from the wall of the cabinet as shown in Fig. 2 to a point approximately four fifths of the distance to the opposite wall, leaving sufficient space for the installation of the elements later to be described, a horizontally arranged partition 4 extending from the end of the receptacle 3 to the wall of the cabinet.

The receptacle 3 normally contains a removable clothes container 5 which is preferably formed with solid end walls and heavy metallic mesh sides, being open at the top and of a shape in cross-section somewhat resembling the upper portion of a heart inverted, as shown in Fig. 1. The clothes container is provided with a trunnion 6 at one of its ends which is adapted to rest in a saddle 7, the saddle being open as is shown by the dotted lines in Fig. 1, the other end of the container carrying a plate 8 (Fig. 6) which carries a series of lugs 9 which are so shaped and located as to engage the tapered and beveled driver 10 carried by the shaft 11 which is journaled in and passes through the bearing 12, the latter being carried by the receptacle 3 and being shown more clearly in Fig. 2.

The outer end of the shaft 11 carries a crank arm 13 which is connected, through the medium of the connecting rod 14, to a crank arm 15, carried on the worm wheel shaft 16, the crank arm 13 being of greater radial length than that of the crank arm 15 so that as the latter turns with the shaft 16 the former is oscillated.

As shown in Fig. 5 the shaft 16 carries a worm wheel 17 which is loosely mounted thereon though normally pressed against a driving disc 18, which is fixed to the shaft 16, by a pressure plate 19, the plate 19 being operated by a spring 20, the tension of which may be adjusted by the nuts 21 at the end of the shaft 16. As shown in Fig. 2 the spring 20 may be compressed to release the driving engagement between the worm wheel 17 and the shaft 16 by a lever 22 fulcrumed at 23 and connected as at 24 to a crank arm 25 on a vertically arranged shaft 26 which is provided with a hand wheel 27.

The worm wheel 17 is engaged by a worm 28 which is carried by the driving shaft 29, this shaft carrying the disc 30 which is engaged by the friction member 31 carried by the shaft of the motor, the motor 32 and its associated parts and mountings, and its method of control being later described herein, the motor and its mechanism being carried on a base 33, which is adapted to be moved by being mounted upon a threaded rod 34, whereby the position of the friction member 31 may be varied with relation to the disc 30 to change the speed of the shaft 16. Any suitable means such as the crank 35 as shown in dotted lines in Fig. 1 may be employed to turn the rod 34 to cause the travel of the motor base 33.

Upon the end of the shaft 29 opposite to that which carries the disc 30 a friction cone 36 is mounted and is adapted to drive either of the friction wheels 37 when one or the other thereof is brought against the cone 36, the two friction wheels 37 being mounted upon a vertically movable shaft 38 (Fig. 4), the lower portion of this shaft being mounted in a sleeve 39, the sleeve being carried in a support 40, the sleeve 39 being provided with a groove 41 near its lower portion which is engaged by a fork 42 carried by a bracket 43 which engages the lower portion of the support 40 in such a manner that it may be turned thereon.

The fork 42 is provided with a socket 44 (Fig. 1) which is adapted to receive one end of a square or other suitable shaft 45, which carries a double pedal 46 carried in any suitable supporting bracket 47, the construction of the parts just described being such that the friction wheels 37 may be either raised or lowered to bring the lower or upper one thereof into contact with the cone 36 to rotate the shaft 38 in either direction, the raising or lowering motion being produced by the operator pressing on one or the other side of the pedal 46. To maintain the wheels 37 in neutral or disengaged position, the support 40 carries a ball 48 engaging a depression in the surface of the sleeve 40 as clearly shown in Fig. 4. The ball 48 acts as a ball lock and, for that purpose, is provided with a suitable spring and plug seat 49 which may be adjusted to impress proper compression force upon the spring to force the ball 48 into the depression in the surface of sleeve 40.

The shaft 38 preferably carries a tube 50 which engages a shaft 51, the engagement between the tube 50 and shaft 51 being in the form of a feather key whereby the shaft and tube will rotate together while permitting telescopic action, the upper end of the shaft 51 as shown in Fig. 3 carrying a pinion 52 which meshes with and drives a pinion 53 which is carried by one end of one of the roller shafts of a wringer 54.

The shaft 51 is preferably enclosed within a housing 55 which, as shown in Figs. 1 and 2, passes through a guide bearing 55ª in the horizontal partition 4 and through a suitable bracket 56 located within the cabinet, the upper end of the housing 55 carrying a two part supporting housing 57 which is composed of mating sections held together by screws 58, the wringer 54 being mounted by means of the housing 57, the engagement between the wringer and the housing being preferably such as shown in Fig. 3 and comprising a groove 59 and a flange 60 carried by the wringer, the groove 59 being engaged by an inwardly projecting flange 61 carried by the housing 57.

One of the bolts 58 which holds the housing 57 together upon the tube 55 is provided with a clamping handle 62 whereby the wringer 54 may be swung to any position around the axis of the shaft 51, and one of the bolts which holds the housing 57 in engagement with the wringer is also engaged with a clamping handle 63 by means of which the wringer may be swung to any position on the axis of the roller shaft which carries the gear 53.

The bracket 56 carries a set screw 64 (Fig. 2) by means of which the tube 55 may be locked either against rotation in its mountings or against reciprocation therein, and to render vertical movement of the wringer easy, I provide any suitable counterbalancing device such as a drum 65 containing a spring and carrying a cable 66 which is attached to a bracket 67 carried by tube 55, the construction and arrangement of these parts being such that when the set screw 64 is loosened the tube 55 may be lowered if in the position shown in Fig. 1, or raised if in its lowered position and the operator only being required to exert sufficient power to overcome the friction of the parts if the counter-balancing device is properly adjusted.

It is to be observed that the handle 63 may be used to release the wringer so that it may be swung from the position shown in Fig. 2 to the position shown by the dotted lines 68, after which the set screw 64 may be released and the wringer lowered to the dotted position 69, whereupon any suitable cover 70 shown in dotted lines in Fig. 2 may be placed over the cabinet thus enclosing all of the mechanism.

When viewed from the position of Fig. 2 the lower portion of the left end of the cabinet is formed as a door or doors which may be opened to give access to the driving mechanism.

Referring more particularly to Fig. 1, I provide a heater 71, which is connected as by pipes 72 and 73 with the washing bath receptacle 3, the heater 71 being provided with any suitable form of heating device such as a gas burner which may be provided with any suitable hose cock 74, the purpose and function of the heater being preferably to maintain the bath at the proper temperature though it may be used to raise the temperature of the bath from cold to whatever is required.

Any suitable drain valve 75, shown more clearly in Fig. 2 may be employed to empty the contents from the receptacle 3.

The motor 32 is provided with a housing 76 which contains the elements for automatically causing the engagement of the cone 31 with the disc 30, and for automatically opening the motor circuit when the machine is overloaded, these elements being shown in more detail in Figs. 7 and 8.

The base 33 is provided with a frame 77 in which the motor 32 is mounted as by screws 78, the motor being mounted so that its shaft 79 may be moved in a horizontal plane.

The motor shaft 79 is extended through the housing 76 and the bearing 80 and carries the cone 31. Between the motor 32 and the bearing 80 a centrifugal governor 81 is mounted, its moving element 82 being provided with a groove which engages pins 83 on the forked arm 84 which is pivotally mounted as at 85 in the housing 76, the arm 84 being extended and passing through the housing and being connected to a link 86 carried by the free end of a bar 87 which is pivotally mounted as at 88 on the base 33, the bar 87 being provided with a set screw 89 which engages a stop 90 on the base 33, the bar 87 being normally pressed toward the stop 90 by means of a compression spring 91 which is adjusted by set screw 92 which passes through a lug 93 on the base 33.

It is to be observed that when the motor shaft 79 is rotating at its proper speed the governor 81, which together with the other parts just described is shown in a position of rest, is fully extended, the forked arm 84 having been moved from the position shown to a position in which its center line coincides with the axis of the pivot 85 and the pivotal connection between the link 86 and the bar 87 thus swinging the motor 32 and housing 76 until the cone 31 assumes the dotted position 94, it being noted that if the cone 31 comes in contact with the disc 30, previously described and shown in Figs. 1 and 2, before it has fully reached the dotted position 94 or extreme position, the linkage between the moving element 82 of the governor and the base 33 will fully operate, any excess of travel of the parts resulting in a movement of the bar 87 around its pivot 88 and a compression of the spring 91, the construction and arrangement of the centers of the linkage being such that when in full speed position the arm 84 and link 86 are in substantial alinement thus relieving the governor of any friction between the pins 83 and the groove of the governor element 82.

To prevent the governor 81 from operating until a substantial speed has been attained by the motor shaft 79, I provide a pair of centrifugally operated hooks which are held in place upon the shaft 79 by a collar 96 and set screws 97, the free ends of these hooks engaging a flange 98 formed upon the end of the moving element 82 of the governor 81, the construction and arrangement of these parts being such that the flange 98 will engage the hooks 95 when the governor is at rest and the governor 81 will be held from expanding and moving the member 82 until a sufficient speed has been attained to throw the hooks out of engagement with the flange 98 whereupon the governor 81 will immediately act to force the cone 31 into engagement with the disc 30 through the linkage previously described.

The free end of the arm 84 carries a pawl 99 which is adapted to engage a ratchet 100 carried upon the shaft of a switch 101, the pawl being thrown into engagement with the ratchet by any suitable means such as the spring 102, the setting and arrangement of the parts being such that when the governor 81 has operated to cause the engagement between the cone 31 and disc 30, the pawl 99 will be retracted so that its operating portion 103 will engage one of the teeth of the ratchet 100 whereupon, should the speed of the shaft 79 be materially reduced, the governor 81 in assuming its position of rest will turn the ratchet 100 thus operating the contacts of the switch 101 to open the motor circuit.

A diagram of the contacts of the switch 101 as well as the main starting and stopping switch is shown in Fig. 8 wherein the starting and stopping switch is shown at 104 and comprises a pair of push buttons 105 which are connected through lead 107 to one side of the motor 108, the other side of the motor being connected through lead 109 with any suitable source of current supply. One end of the bar 106 of the switch 104 may establish connection with a lead 110 which leads to a contact 111 of the switch 101 while the other end of the bar 106 may establish connection through the lead 112 with the contact 113 of the switch 101.

A contact 114 is opposite the contact 113 in the switch 101 and a contact 115 is opposite the contact 111, the contacts 114 and 115 being connected together and, through lead 116 to the source of current supply.

A contact bar 117 is mounted in the switch 101 and is moved from point to point by the ratchet 100, the action of this bar being a step by step movement produced by the ratchet 100 and pawl 99.

It is to be observed that the switch 104 must have a neutral position in which the bar 106 is not in contact with the terminals of either of the leads 110 and 112.

The connection shown in Fig. 8 corresponds to the conditions that will obtain in the operation of the device after the machine has been started and has been overloaded and brought to rest. The switch 104 is shown as establishing the connection between the leads 107 and 110 while the contact bar 117 of the switch 101 is shown as establishing contact between 113 and 114 the lead 112 being open at the switch 104.

To start the operation of the machine again, after the conditions which have produced the overload have been removed, the switch bar 106 of the switch 104 is operated and reversed as to its position thus establishing connection between the leads 107 and 112 to complete the circuit through the motor. Should overload conditions again occur, the switch 101 will be again operated, opening the circuit through the lead 112.

Should it be desired to stop the machine by the use of the switch 104, it may be accomplished by moving the contact bar 106 to its neutral position thereby opening the circuit through both of the leads 110 and 112.

It is to be noted that a practical device may be made by using either half of the mechanism shown in Fig. 7, one half comprising the means for engaging and disengaging the cone 31 with relation to the disc 30, the other half comprising the automatically operated switch.

If used without the switch, and overload conditions occur, the governor 81 will break the toggle formed by the link 86 and its associated parts and move the cone 31 out of engagement with the disc 30 until the motor speed has increased whereupon the governor will again establish the driving connection which, if not sufficiently powerful to move the machine, will slow down the motor and again cause the breaking of the toggle this condition continuing until the operator opens the motor circuit and restores the parts to their proper condition. Should that part of the mechanism which includes the automatic switch be employed, overload conditions will open the circuit and stop the motor. This part of the mechanism being particularly valuable in those machines which employ positive gearing in place of the friction drive I have shown and described.

In the practical operation of a machine such as above described, it is customary to use several tubs by placing the tubs adjacent the machine so that the wringer of the machine may be swung to different positions to the end that the clothes may be passed from the machine through the wringer to one of the tubs, for rinsing, then from this tub through the wringer into a tub containing bluing after which the clothes may again be passed through the wringer and delivered into a basket, the wringer being moved from one position to the other as the clothes are transferred as above described and in order that the operator may follow the progress of the clothes and maintain proper control of the motion of the wringer, after the tubs have been placed adjacent the machine and when it is desired to pass the clothes through the wringer from the first tub to the second one, the operator disconnects the shaft 45 from the socket 44 and turns the socket so that it is approximately at right angles from the position shown in Fig. 1, the shaft 45 and pedal 46 being moved around the caster, the shaft being again inserted in the socket 44 so that the operator stands in the same position in relation to the wringer as formerly occupied, when the wringer was in the position shown in Fig. 1.

When the wringer is again moved, the pedal is also correspondingly moved, the construction being such that the operator may place the pedal in the most convenient position for resting the foot upon it, to cause the engagement of the wringer drive.

It is to be noted that the wringer may be operated in either direction by pressing upon the proper side of the pedal to the end that the clothes may be passed back and forth through the wringer or may be passed completely through the same on either side.

It is also to be noted that the wringer only operates during the time that pressure is applied to the pedal so that the operator, after having gained some experience with the machine may properly gage the capacity of the wringer and will be able to tell from the amount of pressure required whether the machine is in proper condition or otherwise; again by requiring that the operator maintain the pressure for driving the wringer practically all risk of injury to the fingers of the operator is eliminated for the reason that should any of the fingers be caught by the rolls of the wringer, the operator may remove the foot from the pedal whereupon the wringer immediately stops; again the use of the foot on the drive for the wringer leaves both hands of the operator free to handle the clothes.

While I have shown and described the governor 81 as being mounted on the shaft of the motor it is obvious that this or some other form of governor may be mounted on one of the other parts of the machine, as for instance the shaft 29 and the governor properly connected to either cause the engaging or disengaging of the driving mechanism or to operate the switch or to perform both of these functions. It is also to be noted that if desired one governor may be employed for the function of controlling the switch and another governor for controlling the driving connections.

Having thus fully described my invention, I claim:

1. In a device of the class described, the combination of a support, a movable wringer capable when in one position of standing below the top of the support and in another position of standing above the top of the support, means for permitting a swinging movement in a horizontal plane of the wringer when it is in its elevated position, a source of power carried by the support, a gear device between the source of power and the wringer capable of operating the wringer when it is in its elevated position and when it is in its various positions of its swinging movement.

2. The combination with a wringer, of a supporting housing therefor capable of both vertical and horizontal adjustments, a tubular housing below the supporting housing and connected thereto, extensible driving mechanism for said wringer extending through said tubular housing and adjustable simultaneously with the vertical adjustment of the wringer, and a guide bearing through which the upper end of the tubular housing extends and by which the upper end of the tubular housing is anchored against sidesway.

3. A wringer construction for a washing machine comprising a vertically-extending tubular housing, a wringer supporting housing located at the top of said tubular housing, a wringer embodying wringer rolls on said supporting housing means permitting a vertical adjustment of said tubular housing, extensible driving mechanism extending through said tubular housing and said supporting housing for operating said wringer rolls, and means at the base of the wringer support for controlling the direction of rotation of the wringer rolls.

4. A wringer construction for a washing machine, comprising a vertically extending tubular housing, a wringer-supporting housing on said tubular housing, a wringer embodying wringer rolls on said wringer-supporting housing, means permitting vertical adjustment of the tubular housing, extensible driving mechanism extending through said tubular and supporting housings for operating said wringer rolls, two bevel gears on said driving mechanism for respectively operating said rolls in either direction of rotation, a source of power, and means for connecting the source of power to either bevel gear to control the direction of rotation of the wringer rolls.

5. A power wringer construction comprising a wringer, a vertical extensible power shaft therefor to permit the wringer to be raised and lowered with respect to a predetermined plane, and means between the wringer and the power shaft for permitting the wringer, in its elevated position, to swing about said shaft and, in its lowered position, to fold about an axis perpendicular to the shaft to a position below said plane.

WILLIAM G. PETERS.